United States Patent Office 3,562,839
Patented Feb. 16, 1971

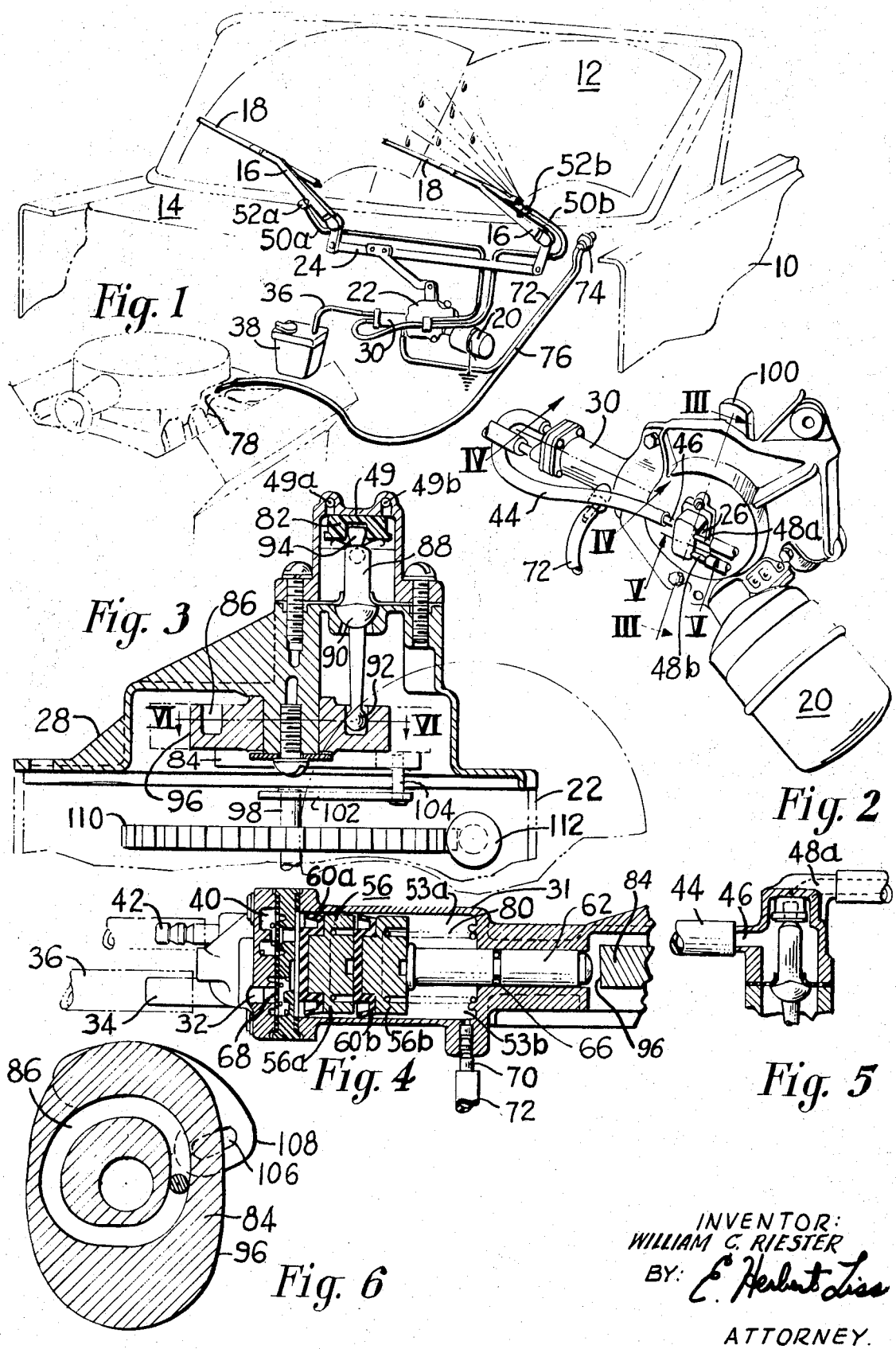

3,562,839
WINDSHIELD CLEANING APPARATUS FOR MOTOR VEHICLES
William C. Riester, Williamsville, N.Y., assignor to Trico Products Corporation, Buffalo, N.Y.
Filed July 12, 1968, Ser. No. 753,015
Int. Cl. B60s 1/48
U.S. Cl. 15—250.02                5 Claims

ABSTRACT OF THE DISCLOSURE

A windshield washer and wiper assembly includes a cam actuated reciprocating piston pump which discharges washer solvent through a distributor valve. The distributor valve directs the pump discharge alternately through one or the other of a pair of nozzles located on the windshield wiper arms. A cam driven by the wiper motor actuates the pump, and also operates the distributor valve to alternately open one or the other of a pair of discharge ports thereby synchronizing the spray of the washer solvent with the position and direction of motion of the wiper arms on the shield.

BACKGROUND OF THE INVENTION

The invention relates to windshield cleaning apparatus for motor vehicles and more particularly to a unique combination of a pump and distributor valve assembly.

Synchronization with the direction of movement and position of the wiper blades in motor vehicle windshield washing apparatus is essential to avoid waste of solvent, impairment of the driver's vision and to provide adequate cleaning of the windshield. Currently conventional windshield washer apparatus provides a simultaneous spray through a plurality of nozzles. In a parallel type wiping system, as distinguished from an opposed wipe type, the conventional simultaneous discharge from a pair of nozzles results in a spray of fluid lagging behind one or the other of the wiper blades. Thus in each pump discharge stroke fluid is not only wasted but serves to obstruct vision.

SUMMARY

The present invention is an improvement on conventional windshield cleaning systems in that it incorporates a distributor valve assembly which provides alternate squirts from one or the other of two nozzles disposed in spaced-apart locations adjacent the windshield. Thus with a parallel-wiping type windshield wiper operation it is possible to discharge fluid in the path of each wiper blade as it begins its outward motion. It will of course be understood that such a system would be useful in any application where discharge of fluids on alternate pump strokes through one or the other of a pair of nozzles is useful.

This coordinated discharge action in prior art devices would require a separate pump at each nozzle. This unique washer action is accomplished with a single pump in the present invention by providing a distributor valve assembly which includes a slide valve movable to open one or the other of a pair of ports wherein each port directs the pump discharge to a separate nozzle. The distributor valve assembly includes a valve stem which transmits the motor output to the valve through a cam surface. Upon rotation of the cam by the wiper motor the valve is moved to close one or the other of the two outlet ports. Another cam surface may be provided operating in coordination with the first mentioned cam surface to actuate a reciprocating pump. The principal of the pump shown in U.S. Pat. 3,209,384 by Anthony D. D'Alba, issued Oct. 5, 1965 may be utilized so that an air spring type of action is provided to maintain the piston rod or plunger against the cam surface.

The principal object of the present invention is to provide an improved windshield wiper apparatus for motor vehicles which utilizes a single pump for providing alternate discharge of fluid through one or the other of a pair of discharge nozzles.

Other objects of the invention will be apparent from the following detailed description taken in connection with the accompanying drawings.

BRIEF DESCRIPTION OF THE DRAWINGS

FIG. 1 is a fragmentary prospective view of an automotive vehicle incorporating the present invention;

FIG. 2 is a prospective view of the wiper motor and windshield washer apparatus;

FIG. 3 is a transverse sectional view taken on line III—III of FIG. 2;

FIG. 4 is a longitudinal section taken on line IV—IV of FIG. 2;

FIG. 5 is a fragmentary sectional view taken on line V—V of FIG. 2; and

FIG. 6 is a lateral section of the cam of this invention taken on line VI—VI of FIG. 3.

DESCRIPTION

In FIG. 1 there is shown a fragmentary view of a motor vehicle 10 which includes windshield 12 and a cowl 14. A pair of arms 16 are secured for rotation on pivot shafts mounted on the cowl and have wiper blades 18 secured thereto at their free end. The arms and blades may be of any suitable construction. Motor 20 and gearbox 22 are suitably mounted on the body of the vehicle 10 preferably at the firewall or within the plenum chamber (not shown). A linkage transmission system 24 transmits the output from a gearbox 22 at the motor 20 to oscillating motion at the wiper arms. The gearbox 22 is closed at its end by an end cap 28 which forms a housing for the distributor valve assembly 26.

Also formed on the end cap 28 is a pump housing 30 having a charging port 32 terminating in an intake nipple 34. Intake nipple 34 is connected in fluid communication to a reservoir 38 through intake conduit 36. The pump also includes a discharge port 40 terminating in a discharge nipple 42 which is connected to the inlet tube 46 of the distributor valve assembly 26 through a conduit 44. The distributor valve assembly includes a pair of outlet ports 49a and 49b connected through outlet tubes 48a and 48b and conduits 50a and 50b to nozzles 52a and 52b respectively. Each of nozzles 52a and 52b may be secured to the wiper arms 16, respectively. Fluid is supplied to the nozzles through conduits 50a and 50b which may be secured to the wiper arms in any suitable manner, as for example, by metal clips. It will of course be understood that in accordance with the broader aspects of the invention the nozzles may be located at any suitable or desirable location as for example on the cowl of the vehicle adjacent the windshield 12.

The pump 30 may be of a type disclosed and described in detail in the above-mentioned U.S. Pat. 3,209,384. It includes a body portion 31 enclosing a chamber 53 for receiving a reciprocating piston or movable wall 56 comprising a pair of stacked pistons 56a and 56b having packings 60a and 60b respectively. The purpose of the dual pistons and piston packings is to reinforce the seal between opposite sides of the piston assembly 56. In accordance with the broader aspects of the invention a diaphragm or other pressure responsive movable wall construction may be utilized in lieu of the piston assembly 56. It should be obvious, of course, that a single piston assembly would be suitable. Piston assembly or movable wall 56 is slidably disposed in chamber 53 and divides the chamber into a first compartment 53a, or dry side, and a compartment 53b, or solvent chamber. A piston rod or plunger 62 extends through the end of housing 31 remote from the charge and discharge ports 32 and 40 and extends into the gearbox 22. An O-ring seal 66 is provided in an annular recess on the plunger shaft to prevent leakage from chamber 53b. Suitable check valves are provided intermediate the chamber 53a and the charging and discharging ports 32 and 40 respectively to permit withdrawing solvent from the reservoir during a charging stroke and ejecting fluid through the port 40 during the discharge stroke of the pump. A vacuum port 70 is provided in communication with the chamber 53b of the pump 30. Port 70 is connected through a conduit 72, a manually operated valve 74 located in the passenger compartment and a conduit 76 to a vacuum source, as for example, the intake manifold 78 of a vehicle engine. The valve 74 may be manually controlled to apply vacuum from the intake manifold to the chamber 53b and to seal the chamber 53b from atmosphere in the "on" position. In the "off" position valve 74 is moved to a position effective to vent the chamber 53b to the atmosphere. A compression spring 80 is provided in chamber 53b to bias the piston assembly 56 to the fluid discharge position, thus preventing accumulation of solvent in the pump body. This is a safeguard against damage due to freezing of solvent within the pump body. In accordance with the broader aspects of the invention other and different types of pumps may be utilized, as for example a rotary pump or other continuous type of pump.

The distributor valve assembly (best shown in FIG. 3) includes a distributor valve 82 disposed between inlet tube 46 and outlet ports 49a and 49b. The valve seat 49 includes ports 49a and 49b communicating with outlet tubes 48a and 48b, respectively. Distributor valve 82 is movable on its seat from a first position closing port 49a and opening port 49b to a second position closing port 49b and opening port 49a. A cam 84 is mounted within end cap 28 for rotation and includes a cam track 86 on the lateral surface thereof eccentric to the rotational axis of cam 84. A valve stem 88 is mounted intermediate its ends for universal movement as at 90 on a ball and socket type pivot. One end 92 of the valve stem 88 is engageable with the cam track while the other end 94 is engageable with the valve 82. As the cam 84 rotates the cam track 86 causes the valve stem 88 to pivot at its socket connection 90 causing valve 82 to move from a position wherein it closes port 49a and opens port 49b to the opposite position where it closes outlet port 49b and opens port 49a. The cam 84 has a peripheral surface 96 which is positioned to engage and cause reciprocation of pump plunger 62 when the plunger is in its extended position. This in turn effects reciprocation of piston assembly 56. Rotatably mounted within the gearbox is a stub shaft 98 which has one end extended outwardly thereof for connection to a crank arm 100 of the linkage transmission 24. The other end of the stub shaft 98 is secured thereto a crank arm 102 having a stud 104 at its free end extending into the end cap 28. The stud 104 engages in a slot 106 formed in the end of the lug 108 which is rigidly secured to the cam 84. Within the gearbox, fixed for rotation with the stub shaft 98, is a wormwheel 110. Engaging the wormwheel is a wormgear 112 fixed to or integral with the motor output shaft. Operation of the motor effects rotation of the wormgear which in turn effects rotation of the wormwheel 110 causing rotation of the stub shaft 98 thereby operating both the linkage transmission 24 of the wiper system and rotating the cam 84 of the distributor valve assembly.

OPERATION

To initiate a windshield cleaning operating switching means 74 may be operated to the "on" position. In such position the switching means may simultaneously energize the wiper motor 20 and admit vacuum from intake manifold 78 to the chamber 53 in a manner well known in the art, thus drawing a piston assembly 56 and plunger 62 into engagement with the peripheral surface 96 of cam 84. As long as the motor runs the cam 96 will rotate thereby causing reciprocation of the piston assembly 56. When the pump plunger 62 moves inwardly, a pressure differential is created across piston assembly 56 tending to drive the piston assembly and plunger outwardly against the peripheral surface of cam 96 thus creating in effect an air spring. As the cam rotates the distributor valve 48 moves from its position closing port 49a to a position closing port 49b. With each discharge stroke the pump projects fluid through conduit 44 to inlet 46 of distributor valve assembly 26 and through either outlet tube 48a or 48b whichever is open to either nozzle 52a or 52b.

When it is desired to discontinue a windshield cleaning operation action manual switch 74 may be turned to the "off" position where it de-energizes motor 20 and vents chamber 53b. When chamber 53b is vented the air spring action of the pump ceases and the spring 80 takes over to maintain the piston assembly 56 in its retracted position. The cam surface 96 drives the plunger 62 inwardly where it remains until vacuum is applied again to chamber 53b.

It should now be apparent that an improved windshield cleaning system has been provided which delivers fluid alternately to the left and right wiper jets only during an outboard stroke, thereby synchronizing fluid jetting with wiper blade motion. A certain specific embodiment of the invention has been described for the purpose of illustration but it will be apparent that various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. Windshield washer apparatus for motor vehicles comprising a pump including a charging port and a discharge port, a distributor valve assembly having an inlet and a pair of outlet ports, conduit means for effecting fluid communication between said discharge port and said inlet and valve means for controlling communication between said inlet and one or the other of said outlet ports alternately, valve operating means for moving said valve means between a first position blocking one of said outlet ports to a second position blocking the other of said outlet ports, driving means for actuating said pump, a cam element having a first surface operatively engageable with said driving means and a second surface operatively engageable with said valve operating means whereby the discharge of said pump is coordinated with the movement of said valve means.

2. Windshield washer apparatus for motor vehicles according to claim 1 wherein said valve operating means includes a valve stem and said second surface of said cam element is operatively engageable with said valve stem for actuating said valve means between said first and second positions.

3. Windshield washer apparatus according to claim 1 or 2 wherein said pump includes a piston and said driving means for actuating said pump includes a piston rod operatively engageable with said piston for effecting reciprocation of said piston, said first surface of said cam element being operatively engageable with said pump stem to effect reciprocation thereof whereby the discharge of said pump is coordinated with the movement of said valve means.

4. Windshield washer apparatus according to claim 1 including manually controlled means for selectively maintaining said driving means for actuating said pump in engagement with said first cam surface.

5. Windshield washer apparatus according to any of claim 1 or 2 wherein said cam element is operatively connected to the output of the wiper motor whereby the discharge of said pump to the windshield is coordinated with the position and direction of motion of the wiper blades.

References Cited

UNITED STATES PATENTS

| | | | |
|---|---|---|---|
| 2,763,023 | 9/1956 | Horton | 15—250.04 |
| 3,427,675 | 2/1969 | Tibbet | 15—250.04X |

FOREIGN PATENTS

| | | | |
|---|---|---|---|
| 410,259 | 5/1934 | Great Britain | 15—250.02 |

ROBERT W. MICHELL, Primary Examiner

U.S. Cl. X.R.

417—485